United States Patent [19]

Takahata et al.

[11] Patent Number: 4,694,092
[45] Date of Patent: Sep. 15, 1987

[54] PARTIALLY HYDROPHILICIZED SILICA GEL AND PROCESS FOR PRODUCING THE SAME

[75] Inventors: Yasuyo Takahata; Ryuji Miyagawa, both of Tokyo, Japan

[73] Assignee: Chemicals Inspection & Testing Institute, Tokyo, Japan

[21] Appl. No.: 946,078

[22] Filed: Dec. 24, 1986

[30] Foreign Application Priority Data

Dec. 27, 1985 [JP] Japan ................................. 60-299160
Dec. 27, 1985 [JP] Japan ................................. 60-299161

[51] Int. Cl.$^4$ ............................. C07F 7/08; C07F 7/18
[52] U.S. Cl. ....................................... 556/400; 204/165
[58] Field of Search .......................... 556/400; 204/165

[56] References Cited

U.S. PATENT DOCUMENTS

Re. 29,948  3/1979  Dwyer et al. ................... 556/400 X
2,531,427  11/1950  Hauser .............................. 556/400 X
3,839,389  10/1974  Neumann ........................... 556/400

*Primary Examiner*—Paul F. Shaver
*Attorney, Agent, or Firm*—Birch, Stewart, Kolasch & Birch

[57] ABSTRACT

Disclosed herein is partially hydrophilicized silica gel which has hydrophobic groups such as octadecylsilyl group on the pore inside and silanol groups or hydrophilic organic groups on the surface. Also disclosed herein is a process for producing such silica gel.

The silica gel has many applications as an adsorbent and catalyst carrier by virtue of the hydrophobic group and silanol group or hydrophilic organic group which are coexistent with each other. The silica gel is produced by performing plasma treatment on silica gel having hydrophobic groups on the entire surface including the pore inside, whereby eliminating the hydrophobic groups on the external surface and causing the silanol groups to appear.

7 Claims, 10 Drawing Figures

RETENTION TIME (MIN.)

RETENTION TIME (MIN.)

4,694,092

PARTIALLY HYDROPHILICIZED SILICA GEL AND PROCESS FOR PRODUCING THE SAME

BACKGROUND OF THE INVENTION

The present invention relates to partially hydrophilicized silica gel in which the pore inside is hydrophobicized and the external surface has silanol groups or hydrophilic organic groups, and to a process for producing the same.

Heretofore, silica gel has found a variety of uses as adsorbent, drying agent, catalyst carrier, etc. by virtue of its porosity and the active silanol groups present on its surface. In the field of analysis, it is used as a carrier or packing for liquid chromatography.

In liquid chromatography, silica gel is generally used as a carrier for normal phase chromatography. Silica gel strongly adsorbs water and other polar solvents and ionic compounds such as amino acids because there are silanol groups on its surface as mentioned above; therefore, it is necessary to protect the silanol groups where such polar solvents are used and highly ionic compounds are to be separated. The protection of silanol groups has been accomplished by introducing an alkylsilyl group, particularly octadecylsilyl group, into them. Silica gel with an alkyl group is used for reversed phase chromatography that employs a polar solvent. The silica gel into which a hydrophobic alkyl group is introduced is characterized by that the entire surface including the pore inside is hydrophobicized by the introduction of an alkyl group. There has been no silica gel in which the hydrophobic group is introduced into a part of the entire surface or the hydrophobic group is introduced into a part of the surface and the hydrophilic organic group is introduced into the rest of the surface.

Recently, there are many instances in the medical and pharmaceutical fields where it is necessary to determine a trace amount of components coexistent with proteins, for example, drugs in serum. If a component coexistent with proteins is to be analyzed by reversed phase chromatography, it is necessary to perform pretreatment for the removal of proteins. The pretreatment is accomplished by adding ammonium chloride to a sample containing proteins, whereby adjusting the pH and precipitating proteins. The precipitates of proteins are centrifugally removed. This pretreatment is necessary because when a protein-containing sample comes into contact with the silica gel having the above-mentioned octadecylsilyl group introduced thereinto, the protein is absorbed and precipitated on the surface of the silica gel. The precipitation and centrifugal removal of proteins need complex and time-consuming procedures, and the precipitation of proteins involves the possibility of coprecipitating the components to be determined. For this reason, there has been a demand for a simple method of analyzing components coexistent with proteins.

SUMMARY OF THE INVENTION

It is an object of the present invention to provide partially hydrophilicized silica gel which has hydrophobic groups such as octadecylsilyl group on the pore inside and silanol groups or hydrophilic organic groups on the surface.

It is another object of the present invention to provide a process for producing such silica gel.

The silica gel of the present invention has many applications as an adsorbent and catalyst carrier by virtue of the hydrophobic group and silanol group or hydrophilic organic group which are coexistent with each other. It is also effectively used as a packing for reverse phase chromatography for the analysis of components coexistent with proteins.

The present inventors carried out an extensive studies on the improvement of the characteristic properties of silica gel, particularly the one into which hydrophobic groups such as octadecylsilyl group have been introduced. As the result, it was unexpectedly found that when silica gel with hydrophobic groups such as octadecylsilyl group is subjected to plasma treatment, the hydrophobic groups are eliminated and silanol groups appear on the surface of silica gel. It was also found that the elimination of hydrophobic groups takes place only at the parts which have been exposed to plasma and the hydrophobic groups on the pore inside remain uneliminated after plasma treatment, with the result that the external surface alone is silanolized. Further, it was found that in the case of plasma-treated silica gel, it is easy to introduce a hydrophilic organic group into the silanol group on the external surface of the silica gel. The plasma-treated silica gel, which has hydrophobic groups on the pore inside and silanol groups or hydrophilic organic groups on the external surface, differs from the conventional silica gel having silanol groups on the entire surface thereof or the modified silica gel having hydrophobic group such as octadecylsilyl group on the entire surface including the pore inside. By virtue of the hydrophobicized pore inside and the active silanol groups or hydrophilic organic groups on the external surface, it has both the hydrophilic property and the hydrophobic property. Therefore, it is useful as an adsorbent and catalyst carrier. The silica gel with hydrophobic groups on the pore inside and with hydrophilic groups on the external surface does not adsorb nor precipitates proteins; therefore, it can be used as a packing for chromatography for the analysis of components coexistent with proteins. The silica gel adsorbs the components to be analyzed but permits proteins to flow freely through the column. These findings led to the present invention.

Accordingly, the present invention provides a partially hydrophilicized silica gel which has hydrophobic groups on the pore inside and silanol groups on the external surface, and also provides a process for producing such silica gel by performing plasma treatment on silica gel having a hydrophobic group on the entire surface including the pore inside, whereby eliminating the hydrophobic groups on the external surface and causing the silanol groups to appear.

The partially hydrophilicized silica gel is effectively used as an adsorbent, catalyst carrier, and analysis carrier by virtue of the hydrophobicized pore inside and active silanol group on the external surface. It can also be used for the production of new silica gel in which a hydrophilic organic group is introduced to the silanol group.

The present invention also provides a partially hydrophilicized silica gel which has hydrophobic groups on the pore inside and hydrophilic organic groups on the external surface, and also provides a process for producing such silica gel by reacting silica gel having hydrophobic groups on the pore inside and silanol group on the external surface, with a compound having a linking group reactive with the silanol group and a hydrophilic group or an organic group which can be made hydrophilic, and making the organic group hydrophilic.

The partially hydrophilicized silica gel of the present invention which is produced by introducing an hydrophilic organic group into a silanol group is effectively used as an adsorbent, catalyst carrier, and analysis carrier by virtue of the hydrophobic group introduced into the pore inside and the hydrophilic organic group on the external surface, which are coexistent with each other. It is advantageously used as a separating agent or condensing agent for the analysis of components coexistent with proteins. The silica gel of the present invention, which has hydrophobic groups on the pore inside and hydrophilic organic groups on the external surface, does not react with proteins, nor does it cause adsorption and precipitation of proteins. When proteins and components to be analyzed are introduced together into a column containing the silica gel, the components to be analyzed are adsorbed to the hydrophobic group on the silica gel but the proteins are discharged as such from the column. Therefore, the silica gel of the present invention can be used for the analysis of a trace amount of components coexistent with proteins. Proteins are completely separated by simply passing a sample through a column filled with the silica gel, and yet the trace components are retained by the silica gel. This procedure obviates the complex time-consuming pretreatment for the precipitation and centrifugal removal of proteins from the sample. Because of these characteristic properties, the silica gel of the invention can be advantageously used for the purification of proteins.

BRIEF DESCRIPTION OF THE DRAWINGS

FIG. 7 is a chromatogram of human serum containing phenobarbital.

FIG. 8 is a chromatogram of water containing phenobarbital. FIG. 9 is a chromatogram of human serum.

DESCRIPTION OF THE PREFERRED EMBODIMENTS

Figure 1:
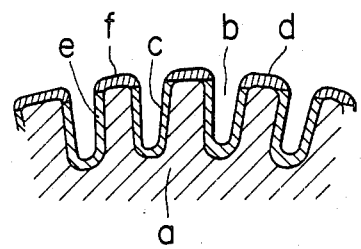
FIGS. 1 and 2 are schematic partial sectional views showing the partially hydrophilicized silica gel of the invention.

As mentioned above, the partially hydrophilicized silica gel of the present invention has hydrophobic groups on the pore inside and silanol groups on the external surface. This silica gel is schematically shown in FIG. 1, in which there are shown silica gel (a), pores (b), pore inside (c), external surface (d), and hydrophobic groups (e) introduced into pore inside (c). Silanol groups (f) on the external surface (d) originate from silica gel (a).

Figure 2:
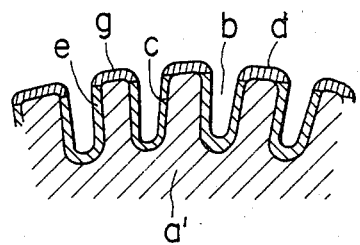

The silica gel (a') schematically shown in FIG. 2 has hydrophobic groups on the pore inside and hydrophilic organic groups on the external surface. This silica gel is formed by introducing hydrophilic groups (g) into the silanol groups (f) in the silica gel (a) shown in FIG. 1.

The hydrophobic group is properly selected according to the application for which the silica gel of the invention is used. If the silica gel is to be used as a packing for liquid column chromatography, the hydrophobic group includes, for example, alkyl groups having 1 to 24 carbon atoms such as propyl, octyl, and octadecyl groups, cyanoalkyl groups having 1 to 24 carbon atoms in the alkyl groups such as cyanopropyl group, and aminoalkyl groups having 1 to 24 carbon atoms in the alkyl groups such as aminopropyl group.

The hydrophilic organic group is also properly selected according to the application for which the silica gel of the invention is used. It is an organic residue containing one or more than one hydroxyl group, carboxyl group, acidamide group, amino group, imino group, polyether group, thiol group, or sulfone group. The number of the hydrophilic groups is not specifically limited. The residue of a silicon compound is preferable.

The silica gel of the invention is not limited in its particulate shape: it may be of spherical shape or irregular shape. Also, the particle diameter, pore size, and surface area of the silica gel are properly selected according to the application for which the silica gel of the invention is used, although the particle diameter is preferably in the range of 1 μm to 3 mm, the pore size is preferably in the ragne of 10 to 4000 Å, and the surface area is preferably in the range of 20 to 2000 m²/g.

The above-mentioned partially hydrophilicized silica gel of the invention as shown in FIG. 1, in which the hydrophobic groups are on the pore inside and the silanol groups are on the external surface, is efficiently produced by performing plasma treatment on silica gel in which the hydrophobic groups are introduced to the entire surface including the pore inside. The plasma treatment eliminates the hydrophobic groups on the external surface, causing the silanol groups originating from silica gel to appear on the surface.

The plasma treatment is carried out preferably by low-temperature plasma. The low-temperature plasma hardly heats silica gel having hydrophobic groups on the entire surface, and yet it can treat the external surface alone. The plasma treatment can be carried out under the following conditions. Pressure: 0.1 to 2 Torr, particularly about 0.5 Torr: Power: 10 to 150 W, particularly about 80 W; Time: 10 to 500 minutes, particularly about 200 minutes. Reagent gas: inorganic gas such as oxygen, moisture vapor, air, argon, helium, and carbon dioxide gas. Oxygen is preferable.

Incidentally, silica gel having hydrophobic groups on the entire surface can be produced according to the known process, and any commercial product can also be used.

The partially hydrophilicized silica gel shown in FIG. 2 in which the hydrophobic groups are on the pore inside and the hydrophilic organic groups are on the external surface, is produced by reacting silica gel having hydrophobic groups on the pore inside and silanol groups on the external surface, with a compound having a chemical linking group reactive with silanol groups and a hydrophilic organic group or an organic group which becomes a hydrophilic organic group upon hydrolysis and hydrophilicizing the organic group, whereby introducing the hydrophilic organic group into the silanol group.

The compound having a chemical linking group reactive with silanol groups such as alkoxysilyl group, chlorosilyl group and the like and a hydrophilic group an organic group which can be made hydrophilic such as epoxy group, hydroxy group, cyano group and the like is selected from those which have the above-mentioned hydrophilic organic group or those which can form the above-mentioned organic group. Examples of the compound include β-(3,4-epoxycyclohexyl)ethyltrimethoxysilane, γ-glycidoxypropyltrimethoxysilane, γ-glycidoxypropylmethyldiethoxysilane, γ-glycidoxypropyldimethylmethoxysilane, γ-glycidoxypropyldimethylchlorosilane, and cyanopropyltrichlorosilane.

The reaction of these compounds with silica gel having hydrophobic groups and silanol groups and the optional reaction to hydrophilicize the organic group are performed under proper conditions selected according to the individual compounds.

In general, the silica gel having hydrophobic groups and silanol groups is suspended in an organic solvent and/or water and then the compound having a chemical linking group reactive with silanol groups and a hydrophilic group or an organic group which can be made hydrophilic is added to the silica gel suspended solution to react the chemical linking groups with the silanol groups. The reaction may be carried out at 0° to 200° C. for 0.5 to 48 hours.

The invention is now described in more detail with reference to the following examples, which are not intended to limit the scope of the invention.

[EXAMPLE 1]

In a 50 ml eggplant-shape flask was placed about 0.8 g of silica gel (5 μm in average particle diameter and 60 Å in pore size) having octadecylsilyl groups on the entire surface including the pore inside. The flask was evacuated to about $10^{-2}$ Torr using a vacuum pump, and then the pressure was adjusted to 0.45 Torr by introducing oxygen gas. The flask was positioned between two opposed copper electrode plates a certain distance apart. With the flask rotating, a high frequency (13.56 MHz) at an effective power of 80 W was applied across the electrode plates, so that an oxygen plasma is generated in the flask. In this way, the silica gel was treated with oxygen plasma for 60 minutes.

Figure 3:
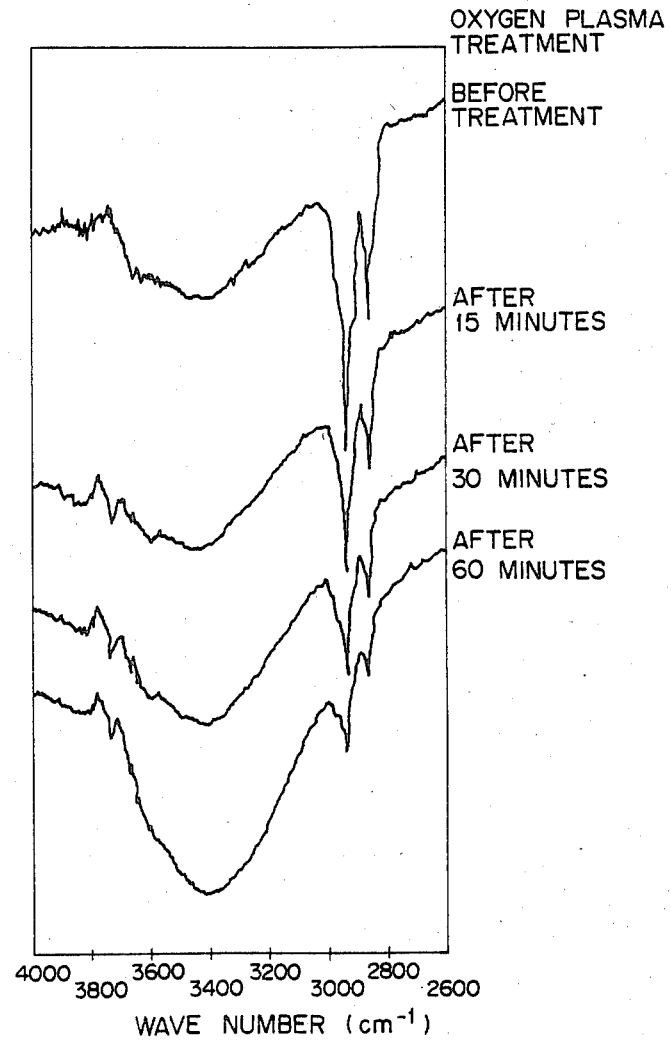
FIG. 3 is infrared adsorption spectra showing the change of the external surface which takes place depending on the duration of low-temperature plasma treatment on the silica gel having octadecylsilyl groups introduced into the entire surface thereof.

The surface of the silica gel changed with time as the result of plasma treatment. This change was measured by means of infrared absorption spectrum (KBr disk method). The results are shown in FIG. 3. The elemental analysis of the silica gel was carried out before and after plasma treatment. The results are shown in Table 1.

TABLE 1

| Silica gel having octadecylsilyl group | Elemental analysis (%) | |
|---|---|---|
| | Carbon | Hydrogen |
| Untreated | 13.97 | 3.04 |
| Treated with oxygen plasma for 60 minutes | 5.04 | 1.39 |

The results shown in FIG. 3 indicate that when the silica gel having octadecylsilyl group on the entire surface undergoes plasma treatment, the absorption due to methylene group at about 2900 $cm^{-1}$ decreases and the absorption due to hydroxyl group at 3400 $cm^{-1}$ increases as the plasma treatment proceeds. The results shown in Table 1 indicate that the content of carbon and hydrogen decreases after plasma treatment. These results suggest that the octadecylsilyl groups on the external surface of the silica gel changed into silanol groups as the result of plasma treatment.

The performance of the silica gel treated with oxygen plasma was evaluated as follows: The silica gel was filled in a column measuring 4.6 mmφ × 30 mm to form a stationary phase. A mobile phase, 75% aqueous solution of $CH_3OH$, was passed at a flow rate of 0.5 ml/min. As a sample, 5 μl of methanol solution containing 1000 ppm of benzene and 20 ppm of biphenyl was injected into the mobile phase. The liquid which had passed the stationary phase was examined by UV spectrometry at a wavelength of 254 nm and a sensitivity of 0.32 AUFS. The same procedure as above was also repeated using untreated silica gel.

Figure 4:
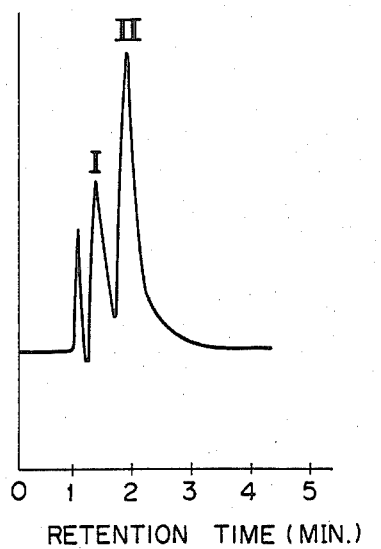
FIG. 4 is a chromatogram obtained when a benzenebiphenyl mixture solution is passed through a column filled with partially hydrophilicized silica gel having hydrophobic groups on the pore inside and silanol groups on the external surface.
Figure 5:
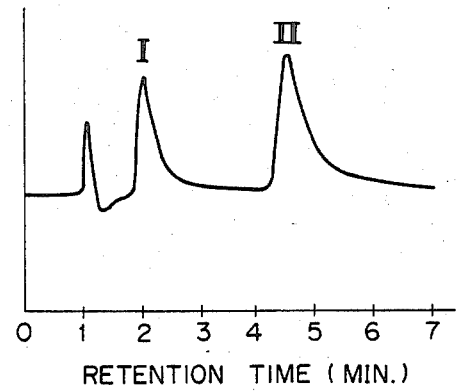
FIG. 5 is a chromatogram obtained when a benzenebiphenyl mixture solution is passed through a column filled with silica gel having octadecylsilyl groups on the entire surface.

The results obtained with plasma-treated silica gel are shown in FIG. 4 and the results obtained with untreated silica gel are shown in FIG. 5. In FIGS. 4 and 5, peak I denotes benzene and peak II denotes biphenyl. The resolution for benzene and biphenyl was calculated from the peaks in FIGS. 4 and 5. The results are shown in Table 2.

TABLE 2

| Silica gel with octadecyl-silyl groups | Retention time (min) | | Relative retention (α) | k' of biphenyl |
|---|---|---|---|---|
| | Benzene | Biphenyl | | |
| Untreated | 2.0 | 4.5 | 3.4 | 3.3 |
| Oxygen plasma treatment for 60 min | 1.4 | 1.9 | 2.8 | 0.7 |

The results shown in FIGS. 4 and 5 indicate that the plasma-treated silica gel is slightly poorer than the untreated silica gel in the resolution of benzene and biphenyl but is capable of separating benzene and biphenyl, which are non-polar. In view of the fact that silica gel having silanol groups on the entire surface does not adsorb and separate nonpolar benzene and biphenyl when used as a packing for liquid chromatography, it is apparent that the silica gel having octadecylsilyl groups is partially hydrophilicized by the plasma treatment.

[EXAMPLE 2]

Silica gel having octadecylsilyl groups on the entire surface including the pore inside (100 Å in pore size) was treated with plasma (water vapor plasma) in the same manner as in Example 1, except that oxygen gas was replaced by water vapor, the pressure in the flask was adjusted to 0.3 Torr, the effective power of high frequency was 50 W, and the duration of plasma treatment was reduced to 30 minutes.

The treated silica gel was examined by the infrared adsorption spectrometry and elemental analysis in the same manner as in Example 1. The results indicate that the external surface of the silica gel was changed into silanol groups as in Example 1.

[EXAMPLE 3]

Silica gel having octadecylsilyl groups on the entire surface including the pore inside was treated with plasma in the same manner as in Example 1, except that oxygen gas was replaced by helium gas, the pressure in the flask was adjusted to 0.6 Torr, the effective power of high frequency was 70 W, and the duration of plasma treatment was reduced to 40 minutes.

The treated silica gel was examined by the infrared adsorption spectrometry and elemental analysis in the same manner as in Example 1. The results indicate that the external surface of the silica gel was changed into silanol groups as in Example 1.

[EXAMPLE 4]

The partially hydrophilicized silica gel obtained in Example 1, which has octadecylsilyl groups on the pore inside and silanol groups on the external surface, was changed into partially hydrophilicized silica gel having octadecylsilyl groups on the pore inside and substituted siloxy groups on the external surface.

The raw material silica gel (0.8 g) was suspended in 5 ml of toluene solution containing 3 mg of triethylamine. After the addition of water (10 mg) and γ-glycidoxy-trimethylsilane (0.37 g), reaction was carried out for 17 hours with refluxing. The solid phase was separated by suction filtration, washed with toluene and then acetone, and dried. The dry solids were suspended in an aqueous solution of ca. $10^{-4}N$ $H_2SO_4$, and hydrolysis was carried out for 2 hours with refluxing. The reaction product was separated, washed and dried at 80° C. Thus the OH group in the silanol group was changed into the substituted siloxy group.

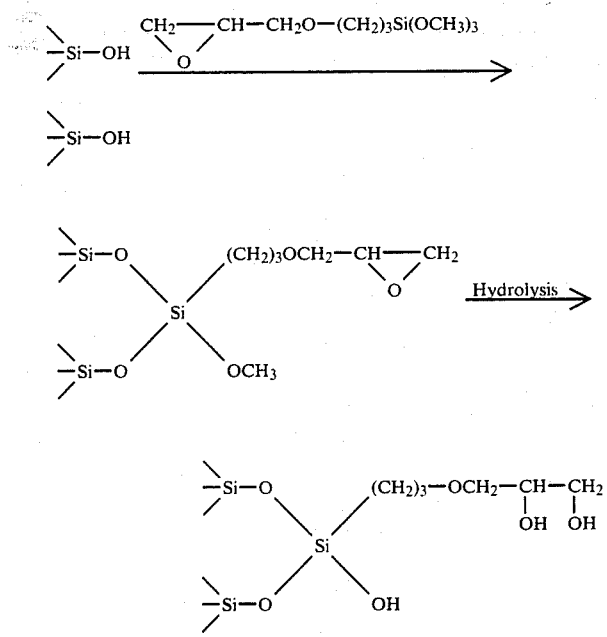

The partially hydrophilicized silica gel having substituted siloxy groups obtained as mentioned above was used as a packing for a concentration column in experiments described in the following.

(EXPERIMENT 1)

Figure 6:
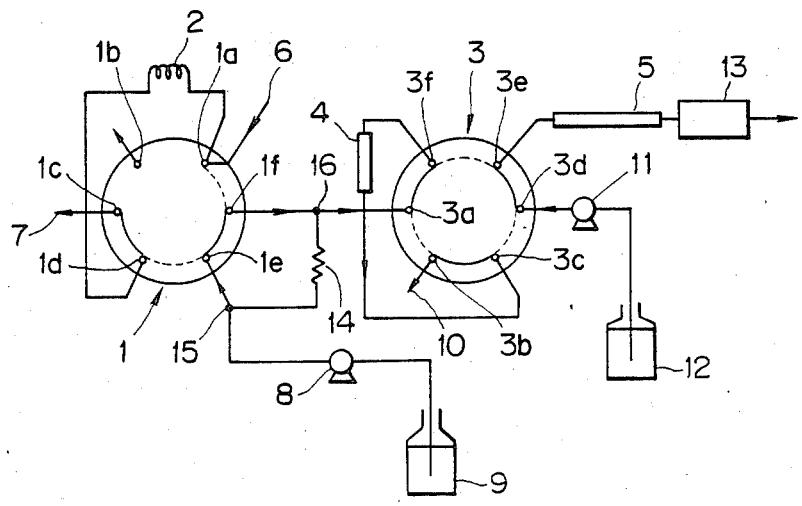
FIG. 6 is a flowchart of an apparatus used for investigating the ability to separate proteins of the partially hydrophilicized silica gel of the invention in which substituted siloxy groups are introduced.

Determination of phenobarbital in human serum was performed using an apparatus shown in FIG. 6.

In FIG. 6, there are shown the first six-way valve (1), the sample loop (2), the second six-way valve (3), the concentration column (4), and the analysis column (5). A sample solution is introduced into the sample inlet (6) of the first six-way valve (1), with the six-way valve (1) positioned so that the passages are established as indicated by solid lines in the figure. The sample solution passes through the first passage port (1a), the sample loop (2), the fourth passage port (1d), and the third passage port (1c), and is discharged from the drain (7). While the sample solution passes through this route, a predetermined amount of sample solution is taken by the sample loop (2). Then, the first six-way valve is turned so that the passages are established as indicated by broken lines in the figure, and the second six-way valve (3) is turned so that the passages are established as indicated by solid lines in the figure. The pump (8) is started and the concentration carrier is introduced from the storage (8) into fifth passage port (1e). The carrier passes through the fourth passage port (1d) and pushes out the sample solution in the sample loop (2). Thus the sample solution passes through the first passage port (1a), the sixth passage port (1f), and the first passage port (3a) and the sixth passage port (3f) of the second six-way valve (3), and finally enters the concentration column (4). The sample solution is concentrated in the concentration solution (4) while it passes through it. The solution leaving the column (4) passes through the third passage port (3c) and the second passage port (3b) and is discharged from the drain (10). Subsequently, the second six-way valve (3) is turned so that the passages are established as indicated by broken lines. The pump 11 is started and the eluent is introduced from the storage (12) into the fourth passage inlet (3d) of the second six-way valve (3). The eluent passes through the third passage port (3c), the concentration column (4), the sixth passage port (3f), and the fifth passage port (3e), and finally enters the analysis column (5). Thus, the concentrated sample is eluted from the column (4). Finally, the sample is introduced from the analysis column (5) to the detector (13).

Incidentally, there are shown the bypass resistance loop (14) and three-way joints (15) and (16) in FIG. 6. In the sample concentration stage, a portion of the carrier is diverted to the bypass resistance loop (14) through the three-way joint (15). The diverted carrier joins, at the three-way joint (16), the sample solution flowing from the sixth passage port (1f) of the first six-way valve (1) to the first passage port (3a) of the second six-way valve (2). Thus the sample solution is properly diluted.

Using the above-mentioned apparatus, the concentration and analysis of samples were carried out as follows.
Sample A: Diluted (6 times) human serum containing 53 ppm of phenobarbital.
Sample B: Water containing 53 ppm of phenobarbital.
Sample C: Diluted (5 times) human serum.
Amount of sample injected: 50 μl
Carrier for concentration: water (flow rate: 1 ml/min)
Eluent: 50% aq. solution of methanol (flow rate: 1 ml/min)

Concentration column: 4.6 mm$\phi \times$ 30 mm, filled with partially hydrophilicized silica gel having substituted siloxy groups obtained by the above procedure.

Analysis column: 4.5 mm$\phi \times$ 250 mm, filled with Zorbax ODS (made by DuPont)

Dilution ratio at three-joint 16: 1/3.84 (sample/carrier)

Analysis: wavelength=254 nm, sensitivity=0.32 AUFS

Figure 7:
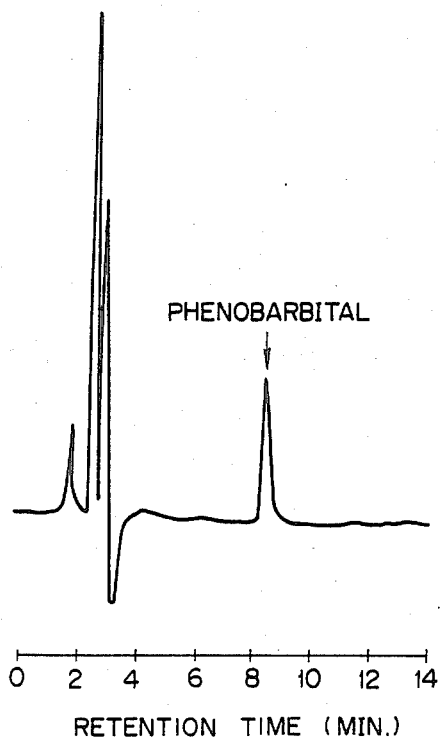
FIGS. 7 to 9 are chromatograms obtained when samples are analyzed using the above-mentioned apparatus.
Figure 8:
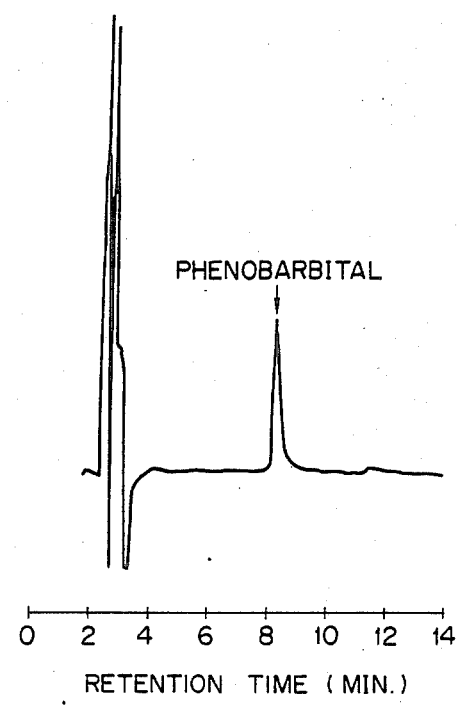
Figure 9:
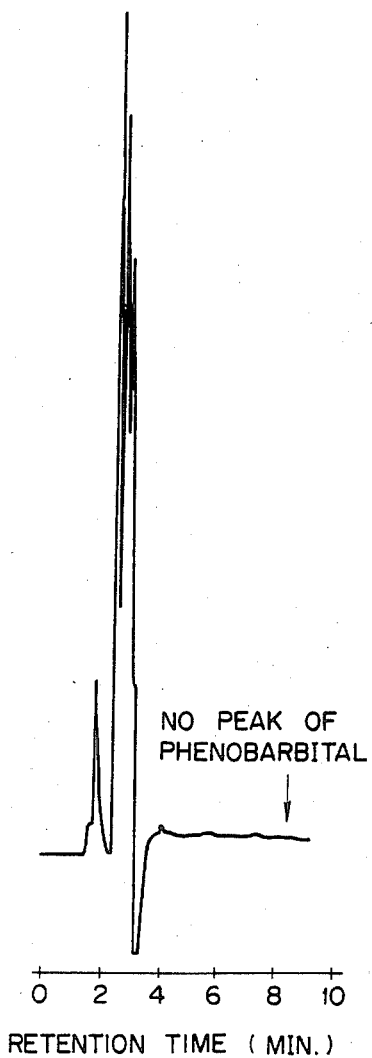

The results are shown in FIG. 7 (Sample A), FIG. 8 (Sample B), and FIG. 9 (Sample C). It is to be noted that the chromatograms in FIGS. 7 and 9 (for the samples containing human serum) do not show the protein peaks as the chromatogram in FIG. 8 (for the sample containing no human serum). This suggests that when the sample solution is passed through the concentration column, the human serum is not adsorbed to the silica gel filled in the column but is discharged from the column together with the carrier. In fact, human serum was detected in the solution discharged from the drain (10). The chromatograms in FIGS. 7 and 8 apparently indicate that the analysis of phenobarbital can be carried out without any effect of proteins (human serum). This experiment demonstrated that the partially hydrophilicized silica gel having substituted siloxy groups used as a packing for concentration can separate proteins and phenobarbital from each other and retain phenobarbital alone.

(EXPERIMENT 2)

This experiment was carried out to evaluate the ability of partially hydrophilicized silica gel to remove proteins.

Figure 10:
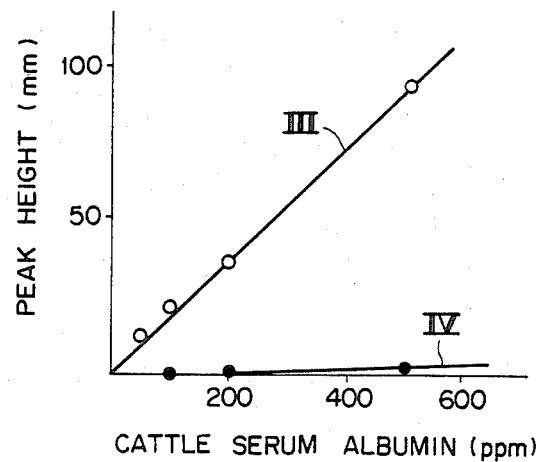
FIG. 10 is a graph showing the amount of cattle serum albumin which has passed through a column filled with partially hydrophilicized silica gel having substituted siloxy groups on the external surface and silica gel having octadecylsilyl groups on the entire surface.

A solution of cattle serum albumin (50 to 500 ppm) was passed through a column filled with the partially hydrophilicized silica gel having substituted siloxy groups on the external surface obtained by the above procedure and a column filled with silica gel having octadecylsilyl groups on the entire surface. The amount of cattle serum albumin was determined as follows:

Column: 4.6 mm$\phi \times$ 30 mm
Eluent: phosphate buffer solution (pH 7)
Measuring wavelength: 280 nm
Sensitivity: 0.04 AUFS
Amount of sample injected: 10 $\mu$l The results are shown in FIG. 10. III denotes the results obtained with the former silica gel, and IV denotes the results obtained with the latter silica gel.

It is to be noted that in the case of partially hydrophilicized silica gel having substituted siloxy groups on the external surface, the peaks get high in proportion with the amount of cattle serum albumin. This suggests that cattle serum albumin passes through the silica gel without being captured. In contrast, the silica gel having octadecylsilyl group on the entire surface adsorbs cattle serum albumin almost completely.

What is claimed is:

1. Partially hydrophilicized silica gel which has hydrophobic groups on the pore inside and silanol groups on the external surface thereof.

2. Partially hydrophilicized silica gel as claimed in claim 1, wherein the hydrophobic group is an alkyl group.

3. A process for producing partially hydrophilicized silica gel which comprises performing plasma treatment on silica gel having hydrophobic groups on the entire surface including the pore inside, thereby eliminating the hydrophobic groups on the external surface and causing the silanol groups to appear.

4. A process as claimed in claim 3, wherein the hydrophobic group is an alkyl group.

5. Partially hydrophilicized silica gel which has hydrophobic groups on the pore inside and hydrophilic organic groups on the external surface thereof.

6. A process for producing partially hydrophilicized silica gel as claimed in claim 5, which comprises reacting silica gel having hydrophobic groups on the pore inside and silanol groups on the external surface, with a compound having a linking group reactive with the silanol and one or more than one hydrophilic group or one or more than one organic group which can be made hydrophilic and then making the organic group hydrophilic.

7. A process as claimed in claim 6, wherein the silica gel having hydrophobic groups on the pore inside and silanol groups on the external surface is one which is obtained by performing plasma treatment on silica gel having hydrophobic groups on the entire surface including the pore inside, thereby eliminating the hydrophobic groups on the external surface and causing the silanol groups to appear.

* * * * *